United States Patent
Turnquist et al.

(10) Patent No.: US 6,286,211 B1
(45) Date of Patent: Sep. 11, 2001

(54) METHOD FOR MAKING A BRUSH-TOOTH SEAL

(75) Inventors: Norman Arnold Turnquist, Carlisle; Osman Saim Dinc, Troy; Frederick George Baily, Ballston Spa; Robert Harold Cromer, Johnstown; Lawrence Edward Rentz, Clifton Park; Christopher Edward Wolfe, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/327,582

(22) Filed: Jun. 8, 1999

Related U.S. Application Data

(60) Provisional application No. 60/125,894, filed on Mar. 24, 1999.

(51) Int. Cl.$^7$ ................................................ B21D 53/84
(52) U.S. Cl. ........................ 29/888.3; 29/436; 277/347; 300/21
(58) Field of Search ................ 29/888.3, 889.2, 29/436; 277/347, 355, 350, 409, 412; 300/21; 415/174.5; 269/47, 50, 54.2, 54.3; 219/69.2, 69.16, 69.12

(56) References Cited

U.S. PATENT DOCUMENTS

| | | | |
|---|---|---|---|
| 4,274,575 | * 6/1981 | Flower | 228/160 |
| 5,181,308 | * 1/1993 | Gray et al. | 29/436 |
| 5,630,590 | 5/1997 | Bouchard et al. | 277/53 |
| 5,678,898 | 10/1997 | Bagepalli et al. | 300/21 |
| 5,749,584 | 5/1998 | Skinner et al. | 277/53 |
| 5,890,873 | 4/1999 | Willey | 415/173.5 |
| 6,027,121 | * 2/2000 | Cromer et al. | 277/347 |

FOREIGN PATENT DOCUMENTS 2301635   12/1996   (GB).

OTHER PUBLICATIONS

Wolfe et al., "Brush Seals in Industrial Gas Turbines", 33rd AIAA/ASME/SAE/ASEE Joint Propusion Conference & Exhibit, Jul. 6–9, 1997, Seattle, WA.

Bagepalli et al., "Hybrid Seal and Rotary Machine Containing Such Hybrid Seal", S.N. 09/159,196, filed Sep. 23, 1998.

Turnquist et al., "Seal Assembly and Rotary Machine Containing Such Seal Assembly", S.N. 09/131,486, filed Aug. 10, 1998.

Turnquist et al., "Brush Seal Segment", S.N. 09/131,485, filed Aug. 10, 1998.

\* cited by examiner

*Primary Examiner*—S. Thomas Hughes
*Assistant Examiner*—John C. Hong
(74) *Attorney, Agent, or Firm*—Donald S. Ingraham; Douglas E. Stoner

(57) ABSTRACT

A method for making a brush-tooth seal, such as a brush-tooth seal which is attachable to a turbine stator, includes obtaining a seal carrier having a groove and having seal teeth and obtaining a brush seal having bristles with tips. The brush seal is engaged in the groove and then attached to the seal carrier. Then, the tips of the bristles of the attached and engaged brush seal are cut, such as with an electric discharge machining (EDM) wire, at a predetermined distance from the longitudinal axis of the seal carrier.

9 Claims, 5 Drawing Sheets

METHOD FOR MAKING A BRUSH-TOOTH SEAL

This application claims priority of a Provisional Application entitled "Combined Brush/Labyrinth or Brush/Vernier Seal with Improved Brush Diameter" by Norman A. Tumquist et al., Serial No. 60/125,894 filed Mar. 24, 1999.

BACKGROUND OF THE INVENTION

The present invention relates generally to seals, such as seals for rotary machines, and more particularly to method for making a brush-tooth seal.

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor shaft, or the rotor blade (i.e., bucket) tips, of the turbine or compressor and the circumferentially surrounding turbine or compressor casing, will lower the efficiency of the gas turbine leading to increased fuel costs. Also, steam-path leakage in the turbine area of a steam turbine, between the rotor shaft, or the rotor bucket (i.e., blade) tips, of the turbine and the circumferentially surrounding casing, will lower the efficiency of the steam turbine leading to increased fuel costs.

Tooth seals are known, such as labyrinth and vernier seals, which have any number of longitudinally spaced-apart and inward-pointing seal teeth. Brush-tooth seals, in the form of brush-labyrinth seals, are known wherein a longitudinally-middle, labyrinthseal tooth is replaced with a brush seal. Steam and gas turbines have positioned a labyrinth seal between the rotating rotor shaft, or the rotating bucket or blade tips, and the circumferentially surrounding stator casing to minimize fluid-path leakage. Steam and gas turbines also have positioned brush seal bristles between the rotating shaft and the circumferentially surrounding stator casing to minimize fluid-path leakage. It has been proposed, in steam and gas turbines, to use a brush-tooth seal positioned between the rotating rotor shaft and the circumferentially surrounding stator casing. In a brush-tooth seal, the brush seal is considered the primary seal because of its better sealing capabilities, and the tooth seal is considered the secondary (or backup) seal.

The conventional method for making a brush-tooth seal for a rotary machine begins with obtaining a seal carrier having a shape of generally a first annular circumferential arc, having a longitudinal axis, having a circumferentially extending and radially-inward-opening groove, and having longitudinally spaced-apart, circumferentially extending, and radially-inward-protruding seal teeth. A brush seal is then obtained having a shape of generally a second annular circumferential arc engageable with the groove. The brush seal is then moved in a circumferential direction about the longitudinal axis during which time an EDM wire, moving in a longitudinal direction, cuts the tips of the bristles at a generally identical predetermined distance from the longitudinal axis. The brush seal, with the cut bristle tips, is then engaged in the groove and attached to the seal carrier. One or more of the finished seal carriers then would be installed in a turbine stator to form a circular brush-tooth ring seal. A typical turbine could have seven or eight ring seal locations.

Applicants found that when approximately seven circular brush-tooth ring seals were installed in a particular turbine, that turbine experienced excessive rotor vibrations and was automatically shut down within approximately fifteen minutes of startup by the vibration trips located on the turbine bearings. When all such seals were removed, Applicants found the turbine would start. What is needed is to solve the problem of being able to use a brush-tooth seal in a rotary machine.

BRIEF SUMMARY OF THE INVENTION

A first expression of the inventive method for making a brush-tooth seal includes several steps. A seal carrier is obtained having a shape of generally a first annular circumferential arc, having a longitudinal axis, having a circumferentially extending and radially-inward-opening groove, and having a plurality of longitudinally spaced-apart, circumferentially extending, and radially-inward-protruding seal teeth. A brush seal is obtained having a shape of generally a second annular circumferential arc engageable with the groove and having bristles with tips. The brush seal is inserted in the groove and then attached to the seal carrier. The tips of the bristles of the attached brush seal are then cut at a predetermined distance from the longitudinal axis of the seal carrier.

A second expression of the inventive method for making a brush-tooth seal is identical to the previously-described first expression with the following limitations. The brush-tooth seal is attachable to a turbine stator in that the seal carrier is attachable to the turbine stator. The bristle tips are cut with an electric discharge machining (EDM) wire.

Several benefits and advantages are derived from the invention. Applicants found that by cutting the bristle tips after (instead of before) the brush seal is installed in the seal carrier, when the seal carriers were installed in a turbine stator to form a circular brush-tooth ring seal, a particular turbine having approximately seven circular brush-tooth ring seals started and continued to operate normally without any rotor vibrational problems and without being automatically shutdown by the vibration trips located on the rotor bearings.

DETAILED DESCRIPTION OF THE INVENTION

Figure 1:
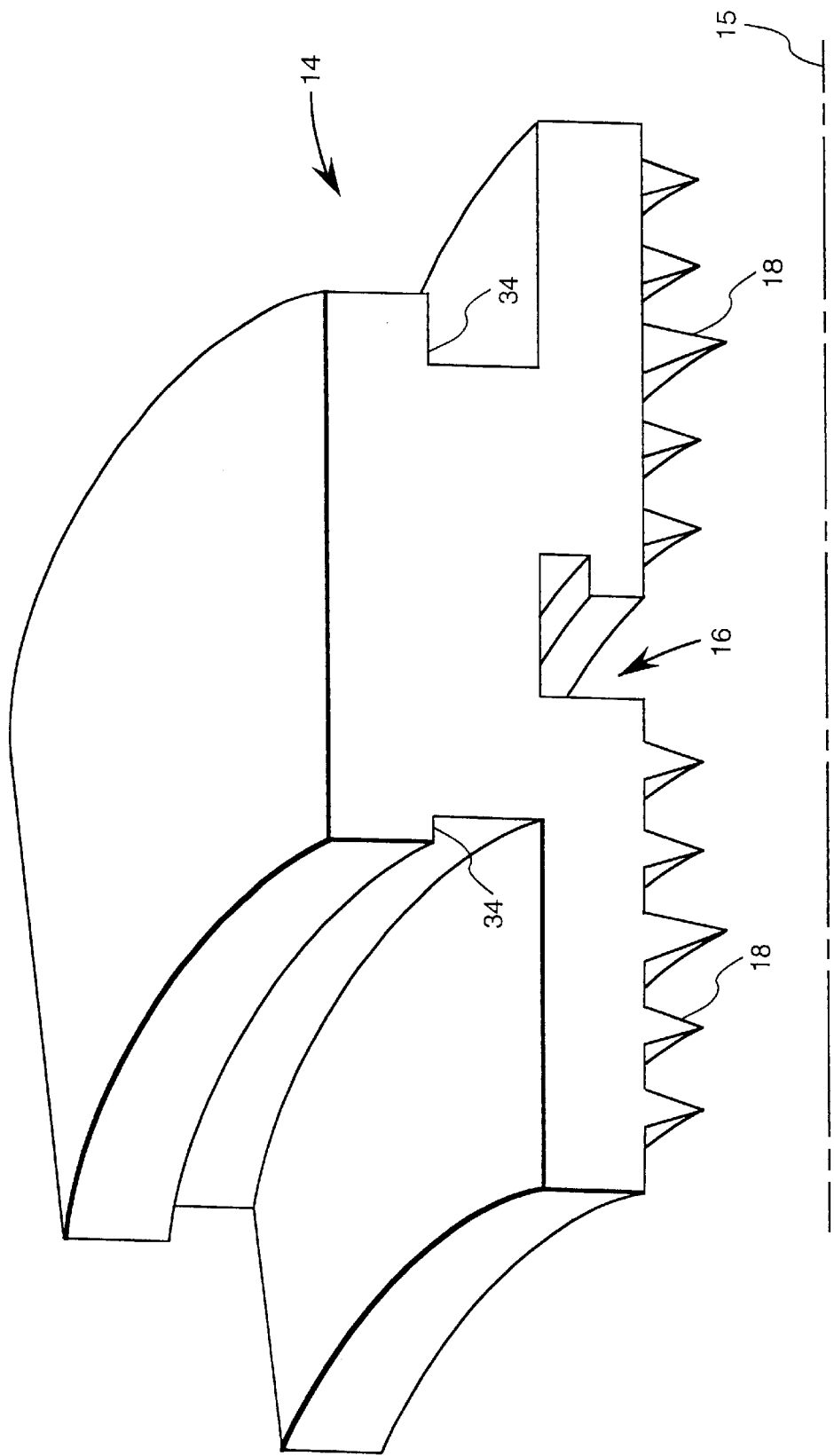
FIG. 1 is a schematic perspective view of a prior-art seal carrier having seal teeth and having a groove
Figure 2:
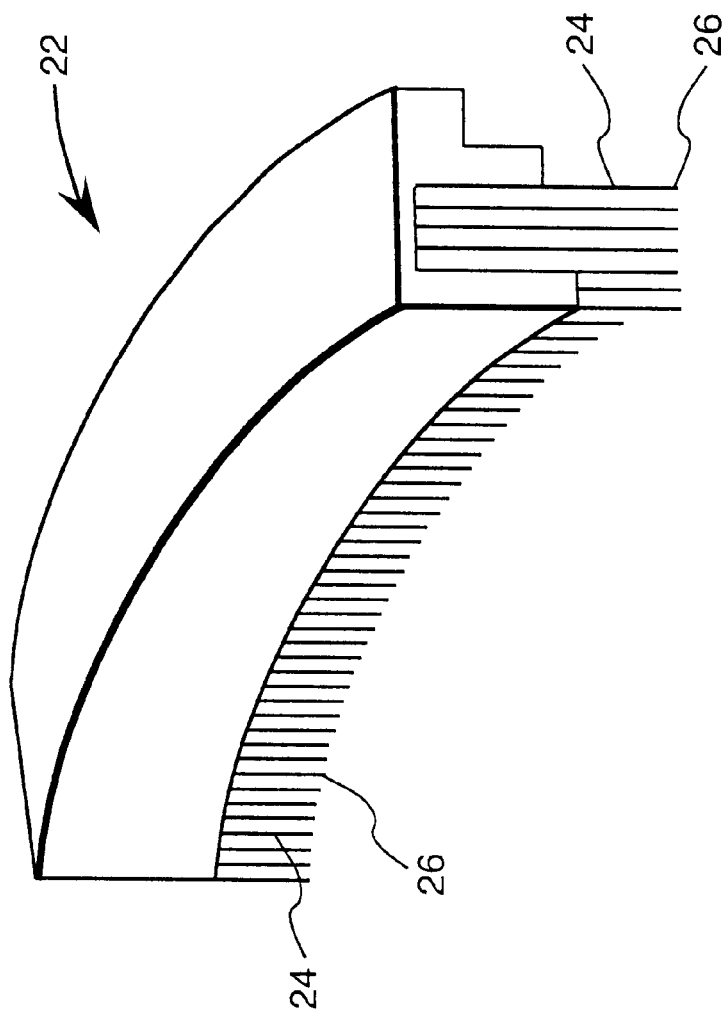
FIG. 2 is a schematic perspective view of a prior-art brush seal having bristles with tips needing cutting.
Figure 3:
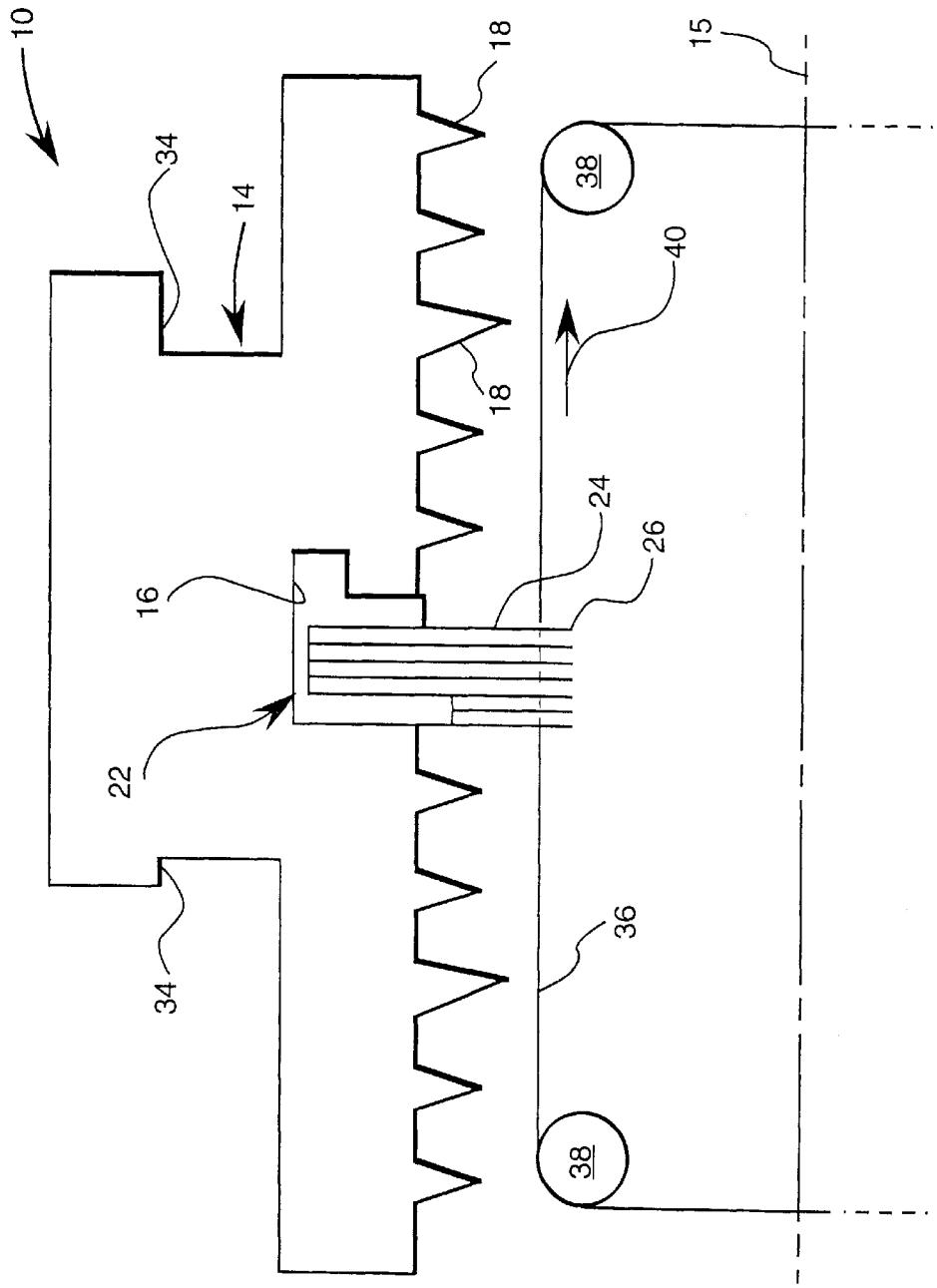
FIG. 3 is a schematic circumferential end view of the circumferential ends of the seal carrier of FIG. 1 and the brush seal of FIG. 2, with the brush seal installed in the groove and attached to the seal carrier, and with an electric discharge machining (EDM) wire shown cutting the bristle tips in accordance with a first exemplary method of the invention.
Figure 4:
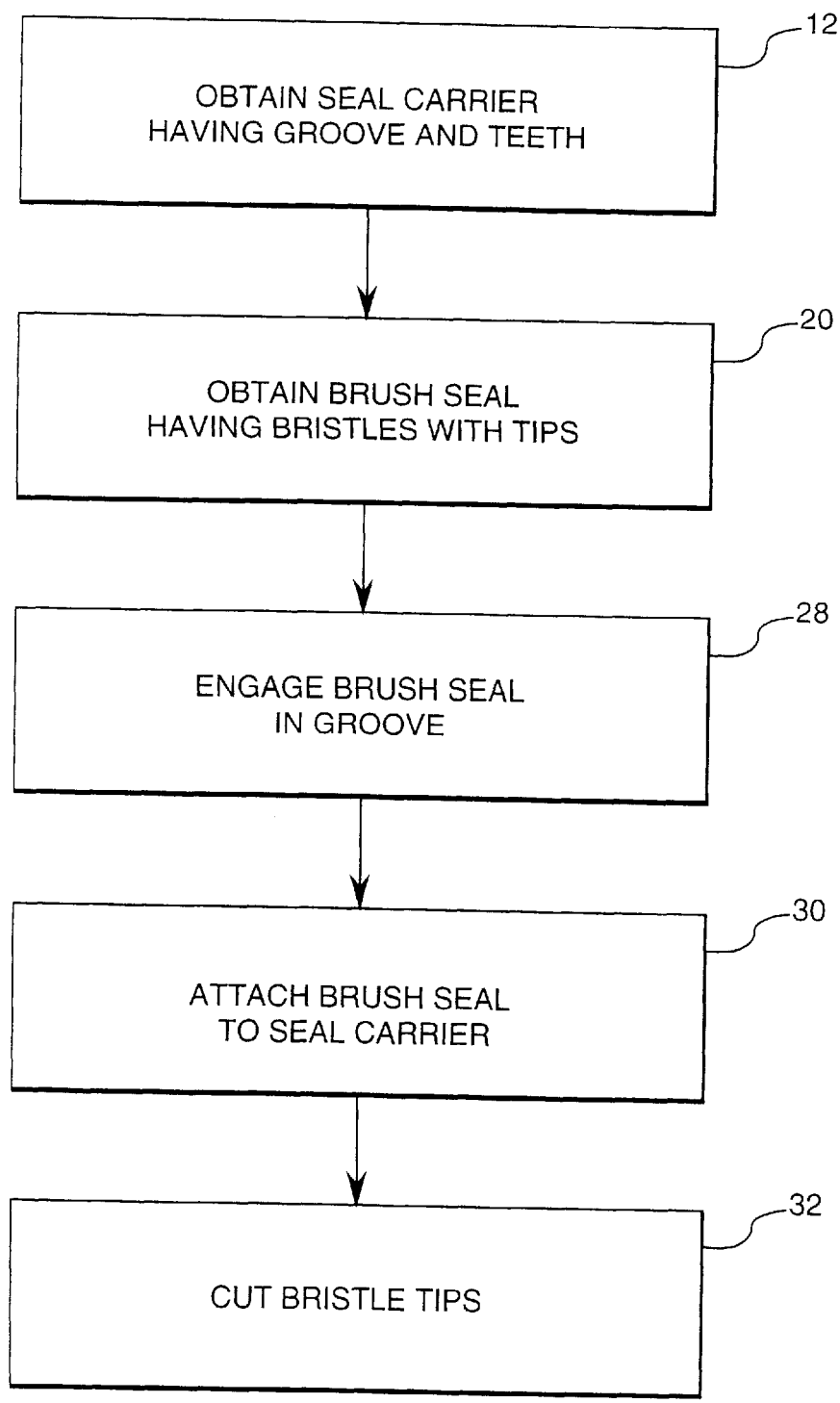
FIG. 4 is a block-diagram flow chart of the first exemplary inventive method, for making a brush-tooth seal, whose bristle tip cutting step is depicted in FIG. 3.

Referring now to the drawings, FIGS. 1–3 schematically show some hardware apparatus, and FIG. 4 shows a flow chart of a first exemplary method of the invention which uses such hardware apparatus to make a brush-tooth seal 10 (seen in FIG. 3). Depending on the circumferential arc length, one or more brush-tooth seals 10 (only one of which is shown in FIG. 3) are conventionally installed in a rotary machine stator in a circular fashion to create a conventional brush-tooth ring seal (not shown in the figures). Rotary machines include, without limitation, turbines for steam turbines and compressors and turbines for gas turbines. The first exemplary method of the invention for making a brush-tooth seal 10 includes steps a) through e).

Step a) is portrayed in block 12 of FIG. 4 as "Obtain Seal Carrier Having Groove and Teeth". Step a) includes obtaining a seal carrier 14 (shown in FIG. 1) having a shape of generally a first annular circumferential arc, having a longitudinal axis 15, having a circumferentially extending and radially-inward-opening groove 16, and having a plurality of longitudinally spaced-apart, circumferentially extending, and radially-inward-protruding seal teeth 18. Such seal carriers and their manufacture are known to those skilled in the turbine art. It is noted that the seal teeth 18 may be monolithic with (as seen in FIGS. 1 and 3), or separate and attached to, the seal carrier 14. In one construction, the seal carrier 14 comprises or consists essentially of stainless steel.

Step b) is portrayed in block 20 of FIG. 4 as "Obtain Brush Seal Having Bristles With Tips". Step b) includes obtaining a brush seal 22 (shown in FIG. 2) having a shape of generally a second annular circumferential arc engageable with the groove 16 of the seal carrier 14 and having a multiplicity of bristles 24 with tips 26. Such brush seals (including those having canted bristles) and their manufacture are known to those skilled in the turbine art. In one construction, the bristles 24 comprise or consist essentially of a cobalt-based super alloy.

The results of steps c) and d) and the process of step e) are shown in FIG. 3. Step c) is portrayed in block 28 of FIG. 4 as "Engage Brush Seal In Groove". Step c) includes engaging the brush seal 22 in the groove 16 of the seal carrier 14. Step d) is portrayed in block 30 of FIG. 4 as "Attach Brush Seal To Seal Carrier". Step d) includes attaching the engaged brush seal 22 to the seal carrier 14. Step e) is portrayed in block 32 of FIG. 4 as "Cut Bristle Tips". Step e) includes cutting the tips 26 of the bristles 24 of the attached and engaged brush seal 22 at a predetermined distance from the longitudinal axis 15 of the seal carrier 14. As viewed in FIG. 3, it is understood that cutting the bristle tips 26 at a prechosen distance from any reference point on the seal carrier 14 (such as the shoulder 34 of the seal carrier 14) is equivalent to cutting the bristle tips 26 at a predetermined distance from the longitudinal axis 15 of the seal carrier 14.

In the first exemplary method, cutting step e) is carried out with a conventional electric discharge machining (EDM) wire 36 seen in FIG. 3. In this cutting step, the EDM wire 36 is supported by rollers 38 and is moved, proximate the bristles 24, in a longitudinal direction (indicated by arrow 40) while the seal carrier 14, with the attached and engaged brush seal 22, is moved in a circumferential direction about the longitudinal axis 15. Applicants found that the longitudinally-moving EDM wire 36 should be radially spaced at least generally 0.005-inch (0.127-millimeter) from any proximate seal teeth 18. A more conservative approach is for the longitudinally-moving EDM wire 36 to be radially spaced at least generally 0.010-inch (0.254-millimeter) from any proximate seal teeth 18. Such radial spacing is required to prevent arcing between the EDM wire 36 and the proximate seal teeth 18 while the EDM wire 36 is cutting the bristle tips 26.

Figure 5:
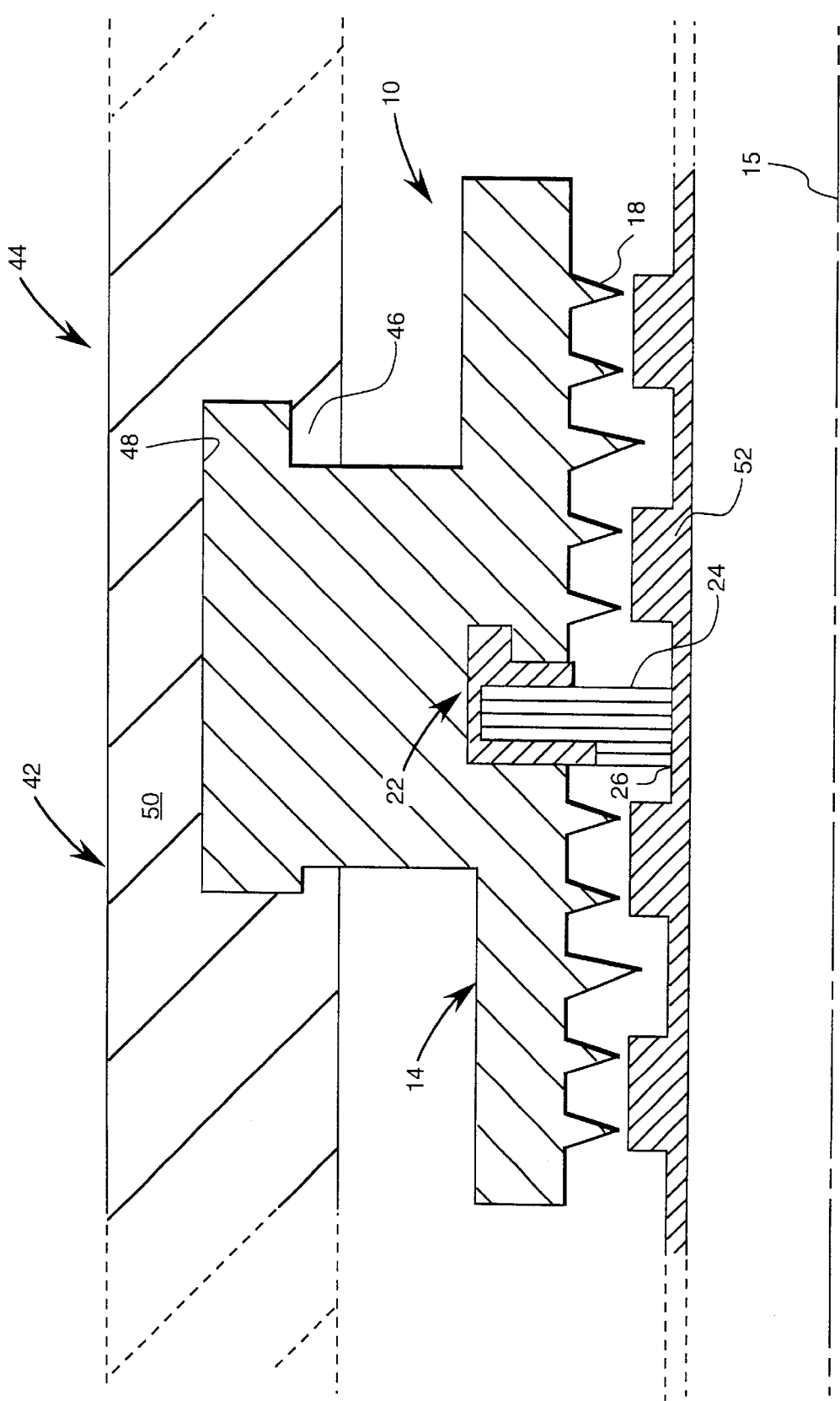
FIG. 5 is a schematic, above-axis, longitudinal cross-sectional view of the brush-tooth seal of FIG. 3 installed in a turbine.

In one application, the brush-tooth seal 10 is attachable to a turbine stator 42 of a turbine 44 (seen in FIG. 5). This conventionally may be accomplished by having the seal carrier 14 be attachable to the turbine stator 42. In one conventional construction, this is done by having the shoulder 34 of the seal carrier 14 rest against a lip 46 of a channel 48 of the turbine stator casing 50 with the bristle tips 26 disposed proximate the turbine rotor 52.

Applicants found that by cutting the bristle tips after (instead of before) the brush seal is installed in the seal carrier, when the seal carriers were installed in a turbine stator to form a circular brush-tooth ring seal, a particular turbine having approximately seven circular brush-tooth ring seals started and continued to operate normally without any rotor vibrational problems and without being automatically shutdown by the vibration trips located on the rotor bearings. Applicants discovered that the prior art method of cutting the brush seal's bristle tips to length before attaching the brush seal to the seal carrier caused errors in the desired distance of the bristle tips from the longitudinal axis of the seal carrier. Applicants discovered the errors were due to the dimensional tolerance errors in the attachment of the brush seal to the seal carrier, and when the bristle tips were too long, they interfered with and caused excessive vibrational problems in the turbine rotor leading to automatic shutdown of the turbine by the vibration trips located on the turbine bearings. It is noted that if the bristle tips are too short, they will not perform their sealing function efficiently. Applicants' method avoids errors in the desired distance of the bristle tips from the longitudinal axis of the seal carrier, despite the dimensional tolerance errors in the attachment of the brush seal to the seal carrier, by cutting the brush seal's bristle tips after the brush seal has been installed in the seal carrier. It is noted that a brush seal alone installed in a turbine stator, or a tooth-seal alone installed in a turbine stator, would not have these problems because they lack the extra seal carrier required by the brush seal portion of a brush-tooth seal.

Applicants' method yields precisely positioned brush-seal bristle tips in a brush-tooth seal. This translates into precise positioning of the bristle tips relative to the rotor when the brush-tooth seal is installed in a rotary machine. This will avoid prior-art problems with turbine rotor dynamics from bristle tip rubs against the rotor which cause rotor vibration which can lead to turbine shutdown by the vibration trips located on the turbine bearings. Precisely positioned bristle tips improve seal performance by increasing sealing efficiency and reducing seal wear.

The foregoing description of several expressions and exemplary methods of the invention has been presented for purposes of illustration, it is not intended to be exhaustive or to limit the invention to the precise form disclosed, and obviously many modifications and variations are possible in light of the above teaching. It is intended that the scope of the invention be defined by the claims appended hereto.

What is claimed is:

1. A method for making a brush tooth seal assemblage for a turbine comprising the steps of:

a) forming a brush seal carrier segment having an attached brush seal, said brush seal having a multiplicity of bristles with tips and said brush seal carrier segment being adaptable for forming a portion of a turbine seal assembly;

b) cutting said bristles of said brush seal carrier segment prior to assembly into said turbine seal assembly to provide a predetermined tolerance between said bristles and a turbine rotor when said brush seal carrier segment is installed in said turbine seal assembly; and c) assembling said brush seal carrier segment with said cut bristles into said turbine seal assembly.

2. The method of claim 1, wherein said cutting step is carried out with an electric discharge machining (EDM) wire.

3. The method of claim 2, wherein said cutting step is performed by moving said EDM wire, proximate said bristles, in a longitudinal direction and by moving said seal carrier with said attached and engaged brush seal in a circumferential direction about said longitudinal axis.

4. The method of claim 3, wherein, during said cutting step, said longitudinally-moving EDM wire is radially spaced at least generally 0.005-inch (0.127-millimeter) from any proximate seal teeth.

5. The method of claim 4, wherein, during said cutting step, said longitudinally-moving EDM wire is radially spaced at least generally 0.010-inch (0.254-millimeter) from any of said seal teeth.

6. A method for making a brush tooth seal assemblage for a turbine, wherein said brush tooth seal assemblage is attachable to a turbine stator, comprising the steps of:

a) forming a brush seal carrier segment having an attached brush seal, said brush seal having a multiplicity of bristles with tips and said brush seal carrier segment being adaptable for forming a portion of a turbine seal assembly;

b) cutting said bristles of said brush seal carrier segment with an electric discharge machine (EDM) prior to assembly into said turbine seal assembly to provide a predetermined tolerance between said bristles and a turbine rotor when said brush seal carrier segment is installed in said turbine seal assembly; and c) assembling said brush seal carrier segment into said turbine seal assembly.

7. The method of claim 6, wherein said cutting step is performed by moving said EDM wire, proximate said bristles of said brush seal, in a longitudinal direction and by moving said seal carrier with said attached and engaged brush seal in a circumferential direction about said longitudinal axis.

8. The method of claim 7, wherein, during said cutting step, said longitudinally-moving EDM wire is radially spaced at least generally 0.005-inch (0.127-millimeter) from any proximate seal teeth.

9. The method of claim 8, wherein, during said cutting step, said longitudinally-moving EDM wire is radially spaced at least generally 0.010-inch (0.254-millimeter) from any of said seal teeth.

* * * * *